United States Patent [19]

Rodriguez-Cavazos et al.

[11] Patent Number: 5,161,002
[45] Date of Patent: Nov. 3, 1992

[54] CONVERGENCE CONTROL SYSTEM FOR MULTIPLE VERTICAL FORMATS

[75] Inventors: Enrique Rodriguez-Cavazos, Indianapolis, Ind.; Günter Gleim, Villingen; Jacques Chauvin, Monchweiler, both of Fed. Rep. of Germany

[73] Assignee: Thomson Consumer Electronics, Inc., Indianapolis, Ind.

[21] Appl. No.: 807,420

[22] Filed: Dec. 13, 1991

Related U.S. Application Data

[63] Continuation of Ser. No. 397,545, Aug. 23, 1989, abandoned.

[51] Int. Cl.$^5$ .................. H04N 7/01; H04N 7/04; H04N 11/20; H04N 11/06
[52] U.S. Cl. .................. 358/140; 358/11; 358/12; 358/141; 315/368.11
[58] Field of Search .................. 358/11, 12, 140, 141; 315/367, 368

[56] References Cited

U.S. PATENT DOCUMENTS

| | | | |
|---|---|---|---|
| 4,385,324 | 5/1983 | Shioda et al. | 358/237 |
| 4,394,690 | 7/1983 | Kobayashi | 358/180 |
| 4,401,922 | 8/1983 | Kamata et al. | 315/368 |
| 4,422,019 | 12/1983 | Meyer | 315/368 |
| 4,437,110 | 3/1984 | Hunaut et al. | 358/163 |
| 4,473,844 | 9/1984 | Klein | 358/163 |
| 4,549,117 | 10/1985 | Takahashi et al. | 358/60 |
| 4,553,164 | 11/1985 | Labb | 358/163 |
| 4,635,117 | 1/1987 | Labb | 358/160 |
| 4,670,784 | 6/1987 | Goldberg | 358/141 |
| 4,672,275 | 6/1987 | Ando | 315/368 |
| 4,680,510 | 7/1987 | Spieth et al. | 315/368 |
| 4,738,216 | 3/1988 | Casey et al. | 358/11 |
| 4,754,204 | 6/1988 | Ando et al. | 358/11 |
| 4,763,194 | 8/1988 | Osman | 358/180 |
| 4,864,405 | 9/1989 | Chambers | 358/180 |
| 4,928,182 | 5/1990 | Guerinot et al. | 358/245 |
| 4,958,229 | 9/1990 | Guillon et al. | 358/180 |
| 4,977,355 | 12/1990 | Rodriguez-Cavazos et al. | 315/368 |
| 4,984,081 | 1/1991 | Miyoshi et al. | 358/180 |

FOREIGN PATENT DOCUMENTS

| | | |
|---|---|---|
| 0004798 | 10/1979 | European Pat. Off. . |
| 2586332 | 2/1987 | France . |
| 62-11388 | 1/1987 | Japan . |
| 63-26174 | 2/1988 | Japan . |
| 63-59191 | 3/1988 | Japan . |
| 63-146672 | 6/1988 | Japan . |
| 63-185173 | 7/1988 | Japan . |
| 63-193779 | 8/1988 | Japan . |
| 89/00369 | 1/1989 | PCT Int'l Appl. . |
| 2176679A | 12/1986 | United Kingdom . |

OTHER PUBLICATIONS

Patent Abstracts of Japan, vol. 12, No. 407, Oct. 17, 1988.
Patent Abstracts of Japan, vol. 12, No. 234, Jul. 5, 1988.
Patent Abstracts of Japan, vol. 12, No. 474, Dec. 12, 1988.
Patent Abstracts of Japan, vol. 12, No. 461, Dec. 5, 1988.

Primary Examiner—John K. Peng
Attorney, Agent, or Firm—Joseph S. Tripoli; Joseph J. Laks; Harvey D. Fried

[57] ABSTRACT

Convergence correction waveforms are generated for multiple vertical formats. One of a number of vertical formats is selected for displaying a video signal. The vertical formats differ by respective vertical scanning rates, respective vertical scanning heights, or both. A set of convergence correction values corresponding to a plurality of raster locations is stored for each of the different vertical scanning heights. An interpolation control value is stored for each of the vertical scanning frequencies. An interpolator is responsive to different ones of the control values for generating a different set of intermediate convergence correction values for each of the vertical scanning frequencies, from each of the sets of stored convergence correction values. The interpolator generates the intermediate convergence correction values between horizontally and vertically spaced ones of the raster locations.

21 Claims, 14 Drawing Sheets

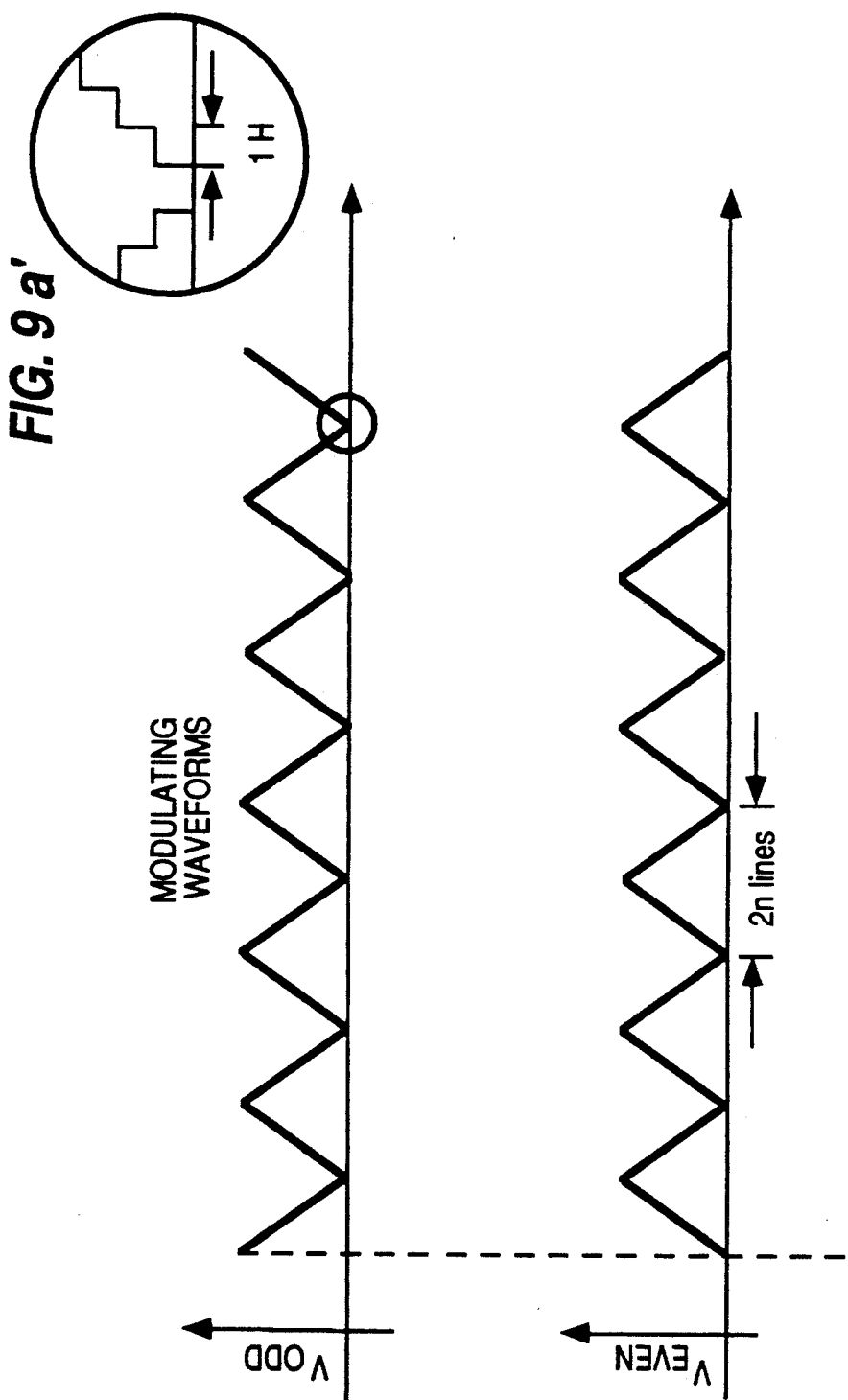

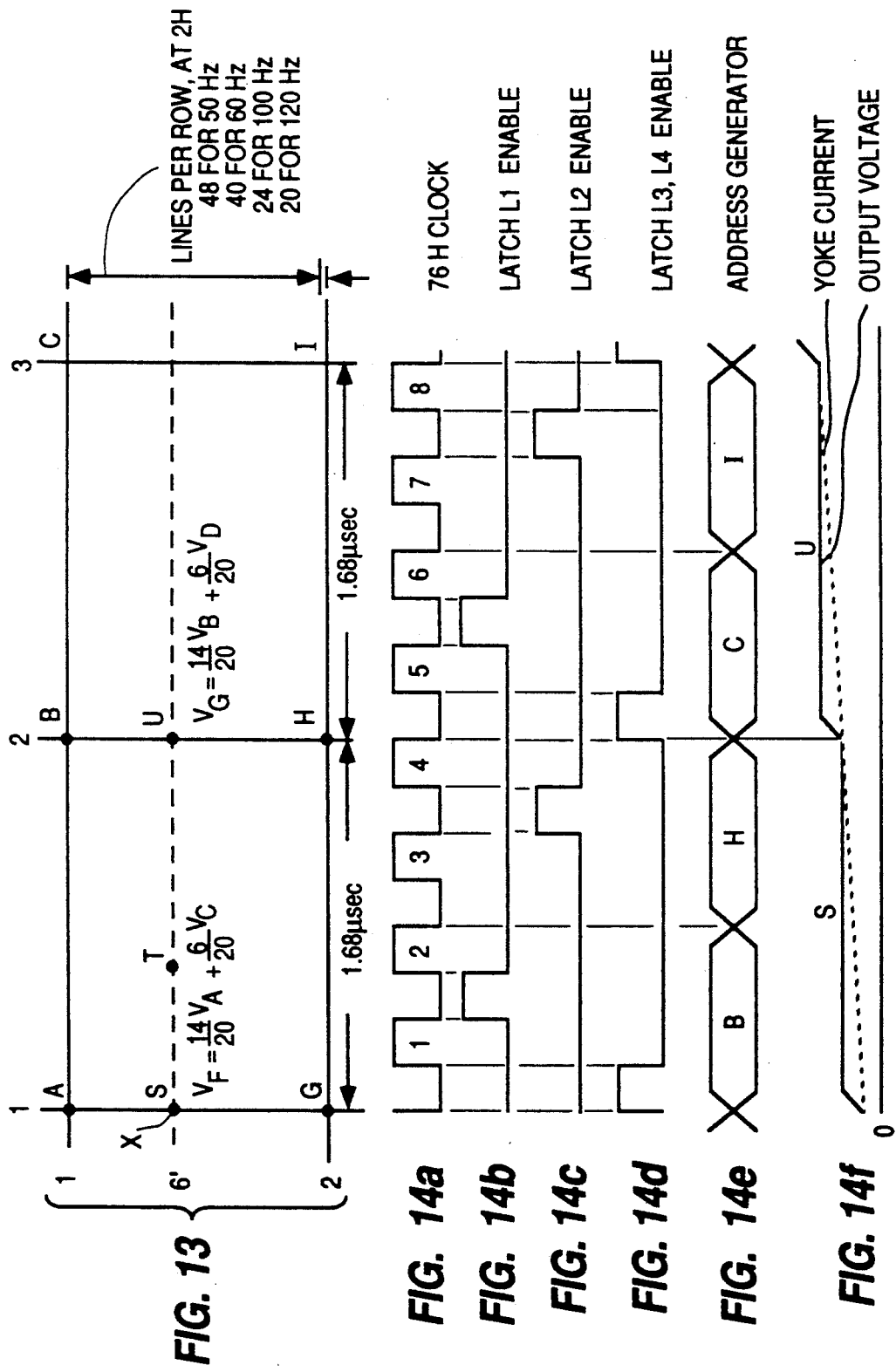

CONVERGENCE CONTROL SYSTEM FOR MULTIPLE VERTICAL FORMATS

This is a continuation of copending application Ser. No. 397,545, filed Aug. 23, 1989, and now abandoned.

This invention relates generally to the field of convergence control systems in television apparatus, and in particular, to convergence control systems operable with different vertical formats, for example, vertical formats having different raster heights.

Convergence control systems must be consistent with the vertical format utilized by a television apparatus. The vertical format which must be employed will be a function of the aspect ratio of the display means in the television apparatus and the aspect ratio of the images in a video source. The aspect ratio of an image is the relative proportion of image width to image height. For most television apparatus, the aspect ratio of the display means is 4:3. This is true for display means embodied as the image display area of a conventional cathode ray tube as well as the screen for a projection television apparatus. Similarly, the aspect ratio of most video sources is 4:3. Under these circumstances, only a single, standard vertical format need be provided. When it is expected that no changes in vertical format will occur, a fixed convergence control scheme can be formulated accordingly.

However, not all video sources originate with a 4:3 aspect ratio. Movies, for example, are transferred from film format to videotape format, for playback or transmission as television signals. It has been the practice when converting such movie sources to a video format to change the aspect ratio to 4:3, as that is the only aspect ratio at which most television apparatus can function. An interesting example of the difficulties entailed by this process are wide screen sources, such as cinemascope which may have an aspect ratio of 16:9. A 16:9 aspect ratio is considered a wide aspect ratio. When transferring film sources to videotape, a device such as a flying spot telecine may be employed. A flying spot telecine has a viewing window or frame with an aspect ratio of 4:3. Typically, an operator moves the window back and forth, from left to right, tracking the center of action in the film, and cropping more or less of the left and right hand portions of the film image as necessary. This can often produce undesirable results from an artistic point of view. In cases where credits appear, or action takes place over the entire horizontal extent of the film image, the results are unsatisfactory. The results of the flying spot technique are exemplified by the sketch in FIG. 2(a), where picture information from the 16:9 source is lost to the left and right sides of the picture shown by the television apparatus, which has a screen having an aspect ratio of 4:3.

Alternatively, the wide screen image can be reduced in scale until its horizontal width fits within the left and right boundaries of a 4:3 aspect ratio. This results in a smaller vertical image height, as shown in FIG. 2(b). The movie source is shown in full, but it fills less than the entire screen of the television apparatus. Dark bars are normally transmitted at the top and bottom, corresponding to the cross-hatched area, so as to avoid spurious signals in the upper and lower border areas. If the horizontal width is compressed, without simultaneously compressing the vertical height, the displayed images will be distorted, for example grossly vertically elongated. Circles in the original image, for example, would appear as ovals having vertically oriented major axes.

Another alternative which has been suggested for displaying wide aspect ratio video sources is to provide a television apparatus with a corresponding wide aspect ratio screen. This is a good solution where it is possible to transmit a video signal having a 16:9 aspect ratio and wherein a television apparatus is provided with a deflection system which generates a raster having a 16:9 aspect ratio. However, there are yet few such sources, and indeed, most such sources have aspect ratios of 4:3. It will be appreciated that a typical original video image having an aspect ratio of 4:3 will not fill a screen having an aspect ratio of 16:9. Blank border areas would be found on the left or right sides, or both.

Video sources having an aspect ratio of 4:3 may be displayed by television apparatus having display means with wide aspect ratios, for example 16:9, by increasing the scale of the raster until the width of the original 4:3 aspect ratio image coincides with the width of the wide aspect ratio display means. Such a vertical format has been referred to as a vertical overscan mode or format. Certain information content along the top and bottom of the source image will be lost, but the resulting image will be a wide aspect ratio presentation.

Changing the vertical format to one of a different height, for example the vertical overscan mode described above, poses a particular problem for convergence control systems. The problem is that horizontal scanning lines will coincide with different vertical positions relative to the display means for the respective vertical modes or formats. A convergence control system consistent with one of the vertical modes will not be appropriate for the other, and vice versa. Some measure must be undertaken to modify operation of a convergence control system in order to be consistent with different vertical formats. Vertical formats are generally distinguished from one another by the height, or vertical extent, of the raster. Different vertical formats will have different upper and lower raster boundaries, for the same video display means.

The active scan area of a display screen, for example, may be divided into a matrix of rows and columns, for purposes of convergence control. The boundary lines of the rows and columns in turn define a cross hatch grid. The number of rows and columns, and accordingly the number of sections, is somewhat arbitrary and depends upon the expected range of correction which is needed, and the desired level of perfection in the resulting raster. During alignment, the green geometry and the red and green DC adjustments are performed first. Thereafter, the exact value of the correction signal at every grid point is determined by superimposing the red, green and blue rasters at that point. These exact values are stored, for example in a non-volatile digital memory, and represent for each correction signal which is required the alignment information for that particular apparatus or instrument.

An interpolation must be performed in both the vertical and horizontal directions in order to provide a smooth transition of the correction signals between adjacent grid points. Each section is defined by values at the four grid points defining the corners of that section. A two-dimensional interpolation must be performed from the known values at the grid points in order to obtain the appropriate correction signal at all points within that section. The interpolation in the horizontal direction may be performed relatively easily, for example by low pass filtering the correction values. This straight forward scheme is possible because the known values occur sequentially as each horizontal line is scanned. For example, to smoothly go from a correction value at point A to an immediately horizontally adjacent correction value at point B, it is necessary to sequentially output the value $V_A$ during a time period equal to a grid spacing between points A and B, and then to output value $V_B$ for the same period. As long as the filter response time is equal to the grid spacing, the correction signal will make a smooth transition from value $V_A$ to value $V_B$. The response time is dependent upon the filter at the output of the digital to analog converter and the response time of the convergence power amplifier which drives the convergence correction coil.

Interpolation in the vertical direction is significantly more difficult, because the known values of vertically adjacent grid points are not sequential as each horizontal line is scanned. Vertical interpolation may be performed in the digital or analog domain, as is known in the art. A digital convergence control system may comprise, for example: a digital memory for storing grid coordinate values defining a convergence correction grid for one channel of a video display, a convergence correction signal generator responsive to the grid coordinate values and to intermediate values between the grid coordinate values, and an analog interpolating circuit for determining the intermediate values. An analog interpolating circuit for determining the intermediate values may comprise, for example: digital to analog converters for the grid coordinate values; and, means for multiplying the values of adjacent vertical grid points, in succession, by complementary factors.

Digital convergence systems utilizing digital or analog interpolation circuits are disclosed in the following U.S. Pat. Nos. 4,401,922; 4,422,019; 4,437,110; 4,473,844; 4,549,117; 4,553,164; 4,635,117; and 4,672,275.

The additional problems for convergence control systems which must provide correction for multiple vertical formats can be appreciated by reference to FIGS. 3 and 4. In each of FIGS. 3 and 4, the dotted line rectangle designated by reference numeral 10 represents the boundary of a video display means of a television apparatus. Such a display means may be the image display area of a cathode ray tube in a direct view television apparatus, or may be the screen of a projection television apparatus. In each of FIGS. 3 and 4, a screen, for example, has an aspect ratio of 16:9, which is the aspect ratio of a typical widescreen motion picture format. The dark solid rectangle designated by reference numeral 12 in each of FIGS. 3 and 4 represents the boundary of the raster for a first vertical format, which for purposes of discussion may be considered a standard or normal vertical format. The dotted dark line designated by reference numeral 14 in FIG. 4 represents the extended boundary of a second vertical format, having a raster height larger than the first or standard vertical format. For purposes of discussion, this format may be referred to as a vertical overscan format. The raster for the vertical overscan format has an aspect ratio of 4:3.

A convergence control signal must be generated for each horizontal scan line in a video signal source. The convergence correction which is necessary is a function of the apparatus itself. The convergence correction factor or value must be the same for any given point on the screen, irrespective of the video source or the vertical format. In accordance with techniques known in the art, convergence correction signals can be generated for each horizontal scan line, such that: the correction signal for the first horizontal scan line coincides with the first horizontal scan line; the correction signal for the second horizontal scan line coincides with the second horizontal scan line; and, so on. The correction signal for the first visible scan line coincides with the first visible horizontal scan line. In FIG. 3, it can be seen that the first visible horizontal scan line will fall between the first and second horizontal grid lines, which are so numbered along the right hand side of the raster. In particular, the first horizontal scan line will fall just below the upper dotted line boundary 10. This same horizontal scan line will not be visible in the overscanned vertical format shown in FIG. 4, as the area between the first and second horizontal grid lines is well above the upper part of boundary 10 of the screen. For the raster shown in FIG. 4, the first visible horizontal scan line will fall between the third and fourth horizontal grid lines, and more particularly, immediately below the upper part of dotted line boundary 10. Accordingly, the convergence correction signal appropriate for the first visible horizontal scan line for the raster in FIG. 3 must be applied to a different horizontal scan line in the raster of FIG. 4. This is so, because the convergence correction values for any given point on the screen must be the same.

A further difficulty stems from the fact that the grids, which are defined by the horizontal and vertical grid lines having respective intersections: A, A'; B, B'; . . . ; N, N'; O, O'; . . . , do not coincide with one another in the respective vertical formats. This is so, because the same number of horizontal scan lines will be present between vertically adjacent horizontal grid lines. The number of transmitted horizontal scan lines in each field is a function of the video source, not the deflection processing circuitry Inasmuch as the same transmission source drives the vertical deflection circuitry for the rasters of both FIGS. 3 and 4, the larger vertical height of the raster shown in FIG. 4 dictates that the horizontal scan lines will be farther apart for the raster shown in FIG. 4. Some television apparatus have a capacity for progressive scanning, for example at double the transmitted horizontal frequency, denoted 2H. If 2H scanning is used for each vertical format, the spacing between horizontal scan lines will still be larger in the overscan mode, even though there are more scan lines than in 1H systems.

Accordingly, a convergence correction grid having the same numbers of horizontal grid lines but having a larger vertical height will have horizontal scan lines spaced farther apart from one another. This factor bears on operation of the interpolation circuits used to generate intermediate convergence correction values between the known correction values, which correspond to the intersections of the horizontal and vertical grid lines. This can be appreciated by a more general consideration of sophisticated convergence control systems.

Certain television apparatus require sophisticated convergence control systems, even for a fixed vertical format. Projection television apparatus, for example, comprise three projection cathode ray tubes, which project red, blue and green rasters, respectively. The images projected by each video projection tube must be properly aligned with one another. Analog waveforms have been used to provide the correction necessary to obtain a substantially correct raster for all three cathode ray tubes. A conventional analog waveform generator will normally correct for the first order imperfections of the raster, but not for the more complicated distortions usually found in such apparatus.

Digital convergence correction systems have been developed to generate more complex correction signals. In one kind of such system, a digital correction value is stored for each and every point of a very extensive grid, points being defined along each vertical scanning line, or as many as possible. This approach would provide maximum correction, but is difficult and expensive to implement. In another kind of such system, a smaller number of correction values are stored, and a digital interpolation circuit determines intermediate values, based on the known values. Digital interpolators can produce good results, but are also expensive to implement. In many cases, the minimum bit requirements of certain components, for example digital to analog converters, needed for the necessary resolution preclude embodying digital interpolators as integrated circuits. In a third kind of system, the smaller number of correction values are stored digitally, but the interpolation is performed in the analog domain. This has proved advantageous, as such circuits can provide adequate precision and resolution, at a lower cost.

Consideration must also be given to the fact that scanning rates, for example progressive scanning rates at 2H, are not the same in all countries and in all television apparatus. Some television apparatus are operable at one or more vertical frequencies, for example 50 Hz, 100 Hz, 60 Hz and 120 Hz. These frequencies correspond to scanning rates based on the principle electrical mains frequencies in Europe and the United States, namely 50 Hz and 60 Hz respectively. Noninterlaced 2H scanning at 50 Hz generates 625 horizontal scan lines per field. Noninterlaced 2H scanning at 60 Hz generates 525 horizontal scan lines per field. Interlaced 2H scanning at 100 Hz generates 312½ horizontal scan lines per field. Interlaced 2H scanning at 120 Hz generates 262½ horizontal scan lines per field. This is true for each vertical format, for example normal and overscanned.

It is an aspect of the invention to provide a convergence control system operable with different vertical formats. In accordance with this aspect of the invention, a convergence control system for a vertical deflection circuit operable in vertical modes, having respective rasters with different vertical heights, comprises a selector for initiating operation in one of the available vertical modes and a circuit for generating convergence correction signals responsive to the selector. The correction signals are generated from known convergence correction values and by interpolation of the known values. The convergence correction values may be stored and sequentially processed by digital circuits and the interpolation may be undertaken by analog circuits. According to one aspect of the invention, the video display, on either the display area of a direct view cathode ray tube or the screen of a projection television apparatus, may have an aspect ratio of approximately 16:9. Another vertical format may have an aspect ratio of approximately 4:3.

The circuit for generating convergence correction signals in accordance with an aspect of the invention may comprise a digital data store for different sets of convergence correction values, for generating selectable sets of correction signals for different vertical modes or formats, for example normal and overscanned modes. The sets of convergence correction values define different sets of grid lines substantially parallel with the horizontal scan lines. Adjacent ones of the grid lines are spaced from one another at different intervals for different vertical formats. The intervals between adjacent horizontal grid lines are greater for vertical formats having rasters with greater vertical heights.

It is another aspect of the invention to provide a convergence control system having an interpolating circuit operable at different horizontal scanning rates, and in interlaced and noninterlaced fashion, for each vertical mode. In accordance with this aspect of the invention, an interpolating circuit for processing the known convergence correction values is responsive to the horizontal deflection circuit. The interpolating intervals can be adjusted to correspond to the vertical scanning rate. The number of interpolating intervals is matched to the number of horizontal scan lines in each field. In one embodiment according to this aspect of the invention, the interpolating circuit may comprise a digital to analog converter having a selectable reference input signal for each horizontal scanning rate, and an up/down counter for modulating the digital to analog converter, the counter having a selectable maximum count to adjust the period of the correction waveform for each vertical mode or format. In another embodiment according to this aspect of the invention, the interpolating circuit may comprise a digital to analog converter having a fixed reference input, and a variable step counter for modulating the digital to analog converter, the counter having a selectable step to adjust the period for each vertical mode or format.

FIGS. 1, 2(a) and 2(b) illustrate the relative dimensions of video display screens and video sources having different aspect ratios.

Figure 6:
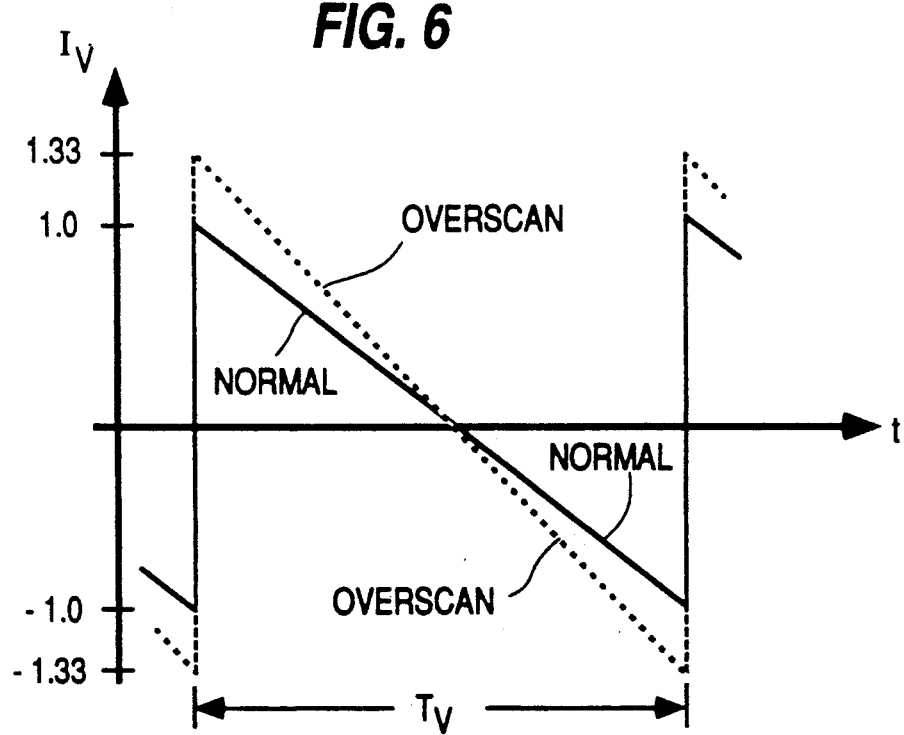

FIG. 6 graphically illustrates the difference in vertical deflection currents for rasters of different vertical height.

Figure 7:
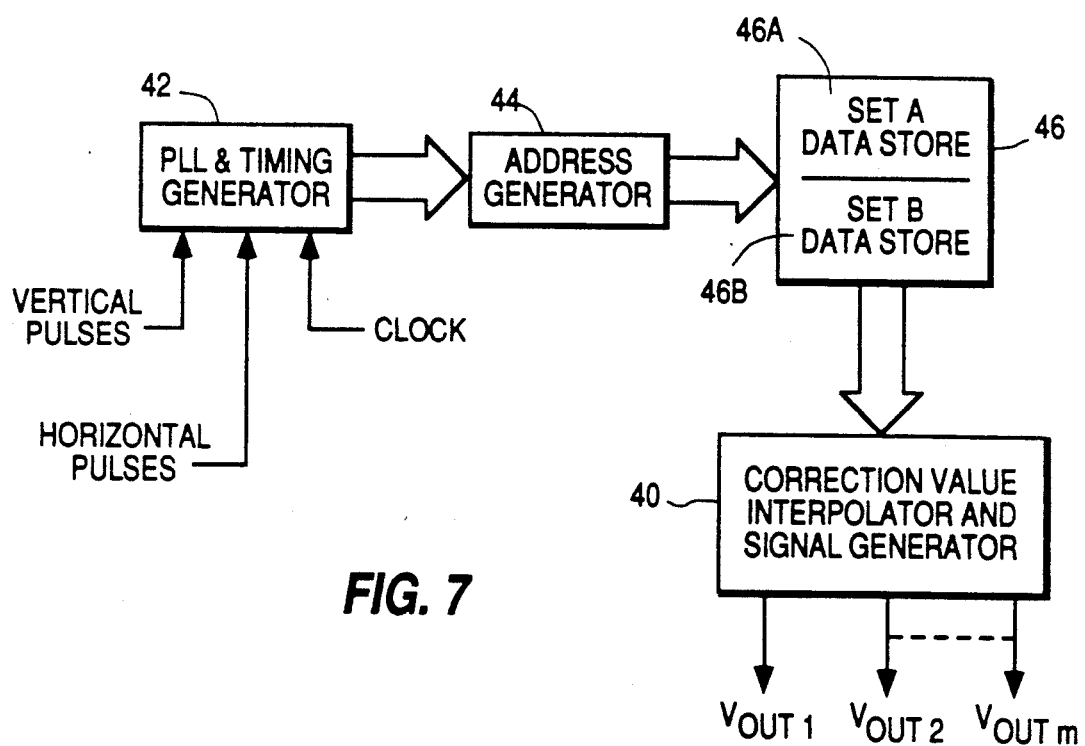

FIG. 7 is a block diagram of a convergence control system in accordance with this invention.

Figure 8:
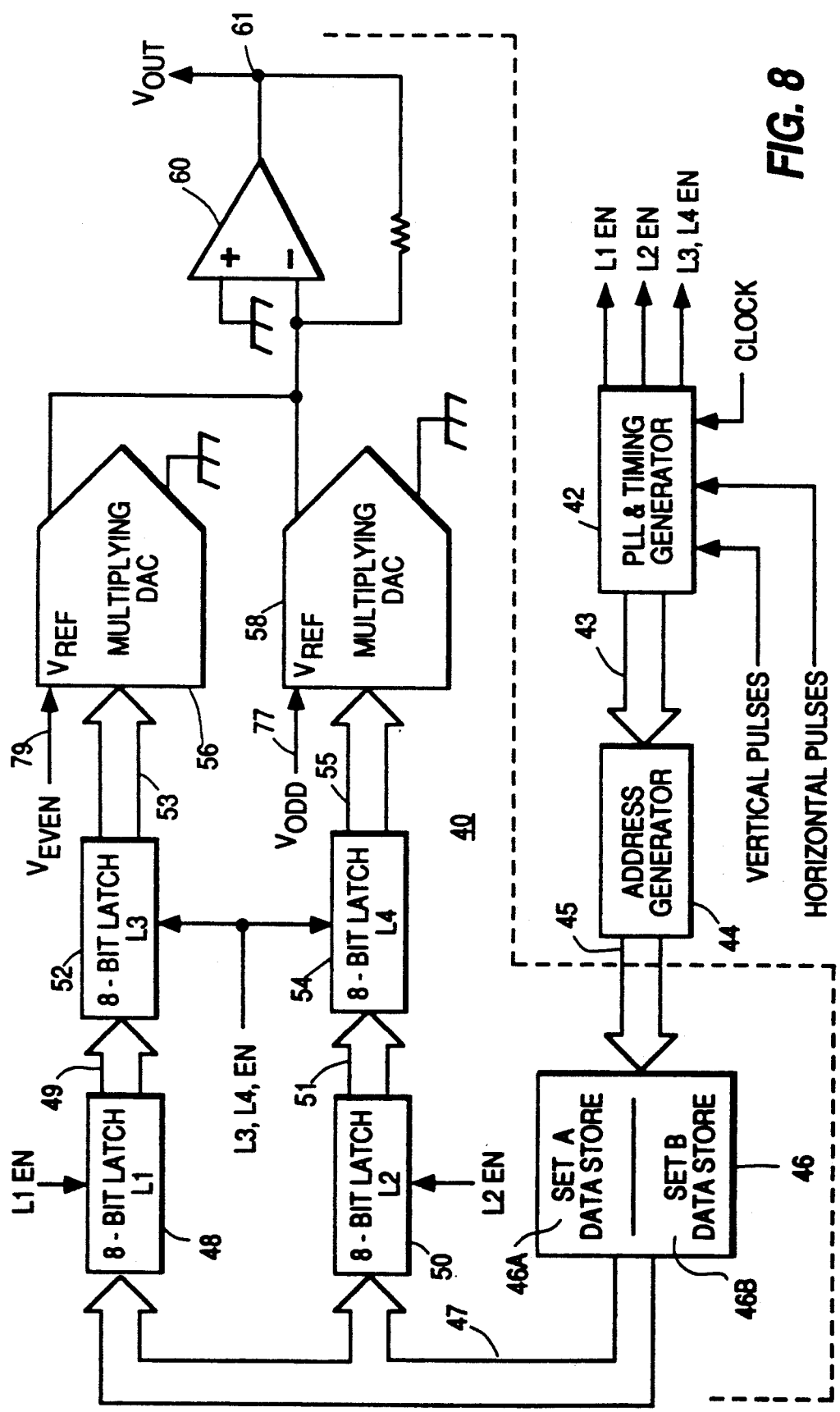

FIG. 8 is a block diagram including a detailed interpolating circuit for a single channel in a digital convergence control system in accordance with FIG. 7.

FIGS. 9(a) and 9(b) illustrate modulating waveforms for the multiplying digital to analog converters shown in FIG. 8.

FIG. 9(a') is an enlargement of the area circled in FIG. 9(a).

Figure 10A:
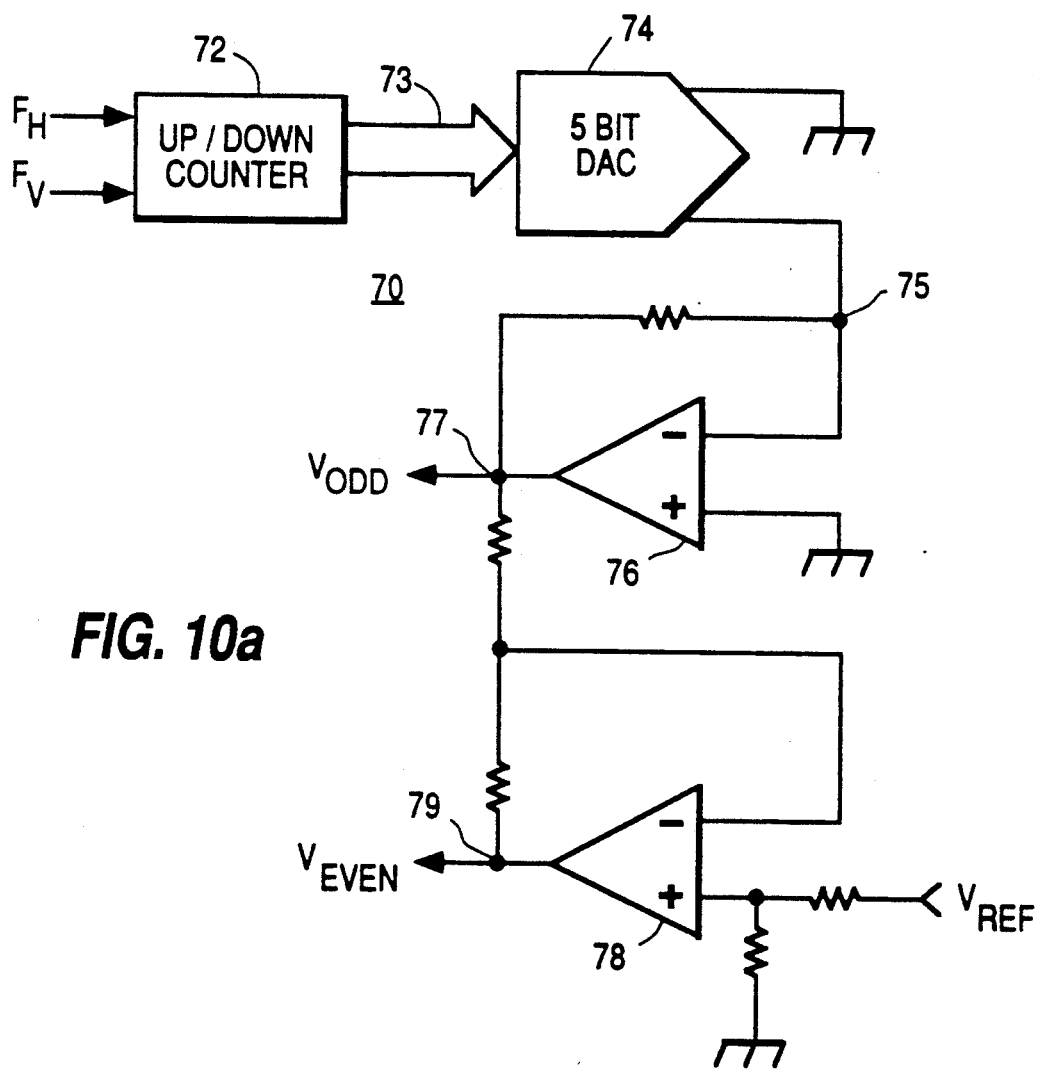

FIG. 10(a) is a block diagram of a circuit for generating the modulating waveforms shown in FIGS. 9(a) and 9(b), for a fixed horizontal deflection rate.

Figure 10B:
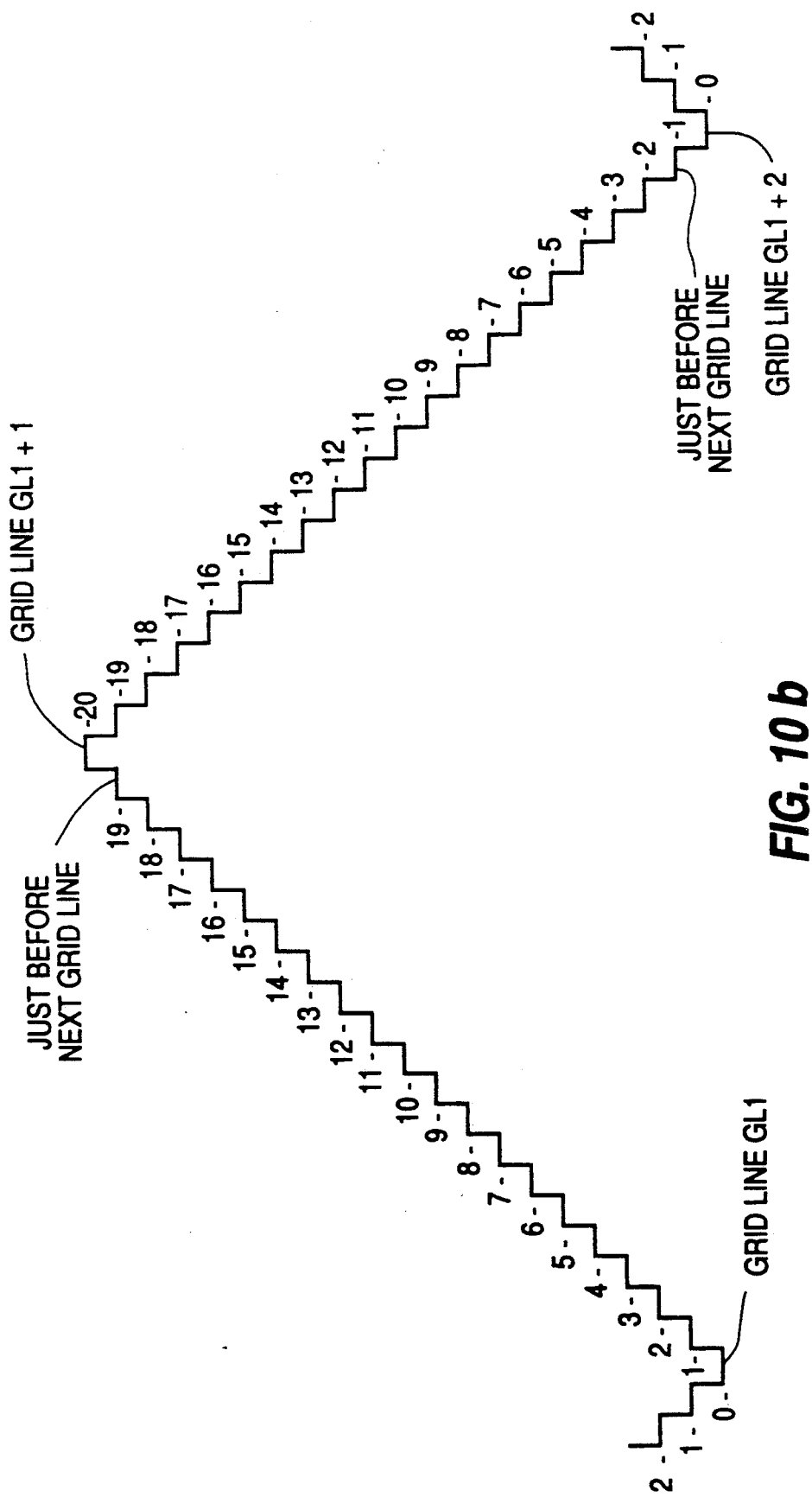

FIG. 10(b) is a clock counting diagram for the circuit shown in FIG. 10(a).

Figure 11:
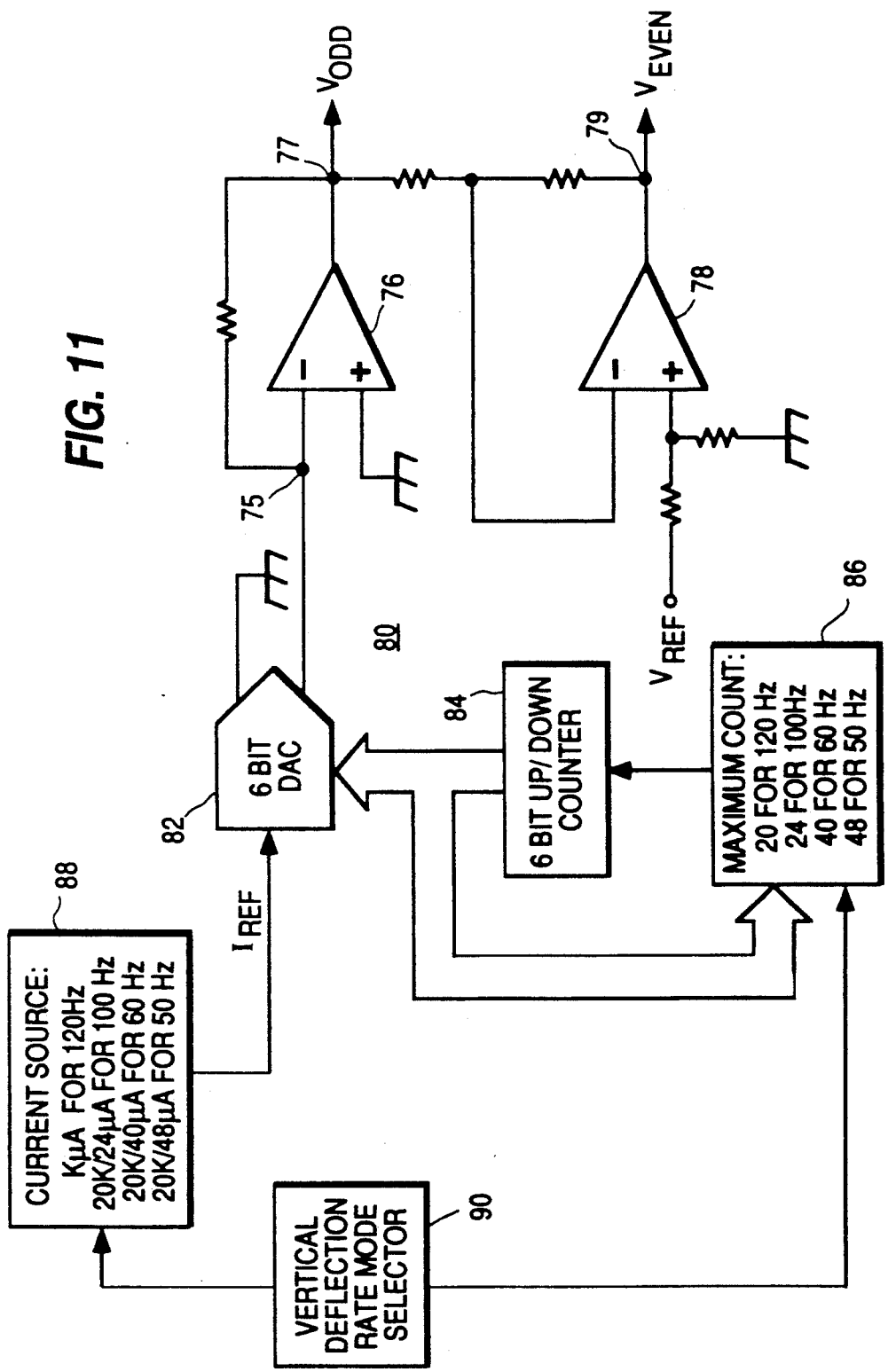

FIG. 11 is a block diagram of a circuit for generating the modulating waveforms for multiple vertical deflection rates.

Figure 12A:
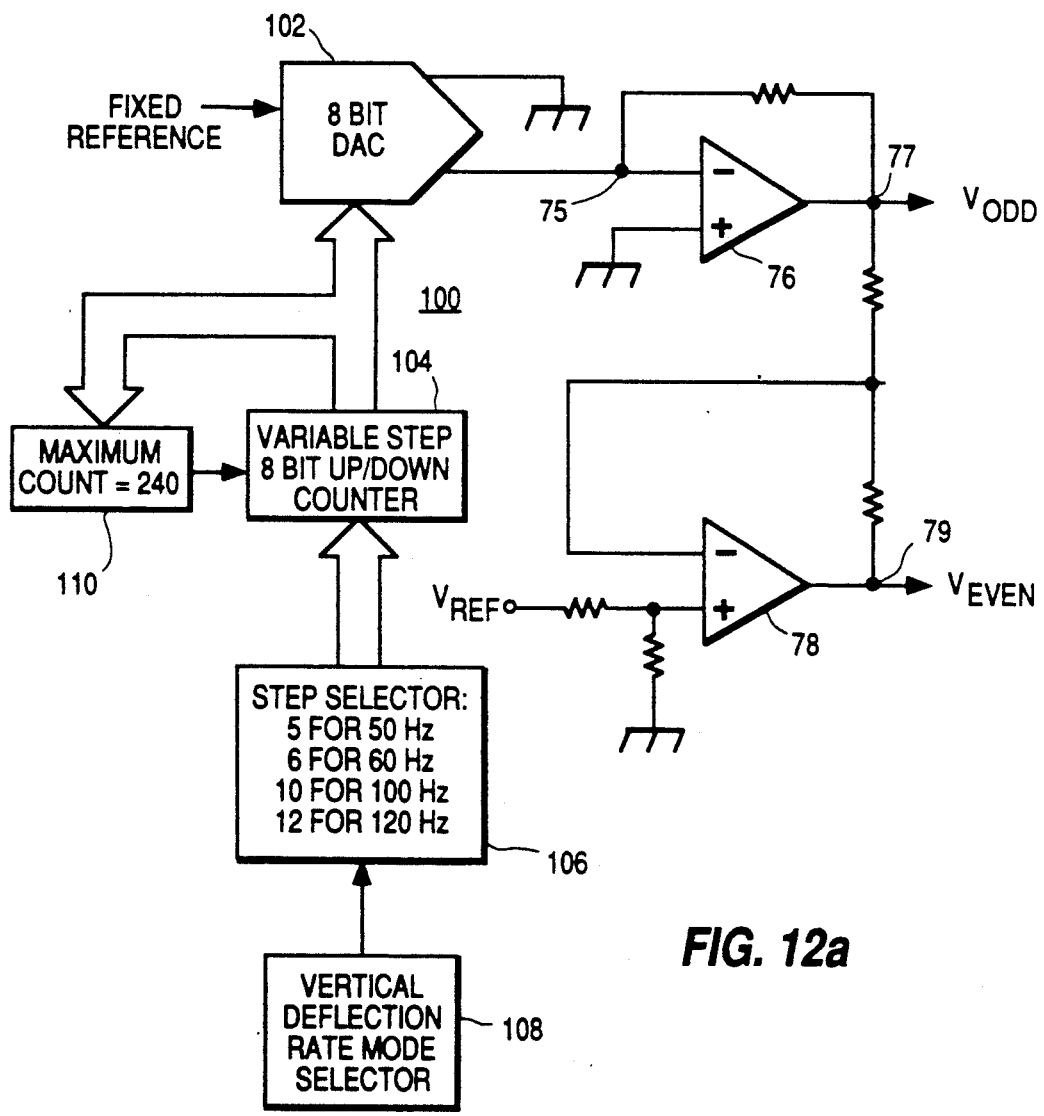

FIG. 12(a) is a block diagram of an alternate circuit for generating the modulating waveforms for multiple vertical deflection rates.

Figure 12B:
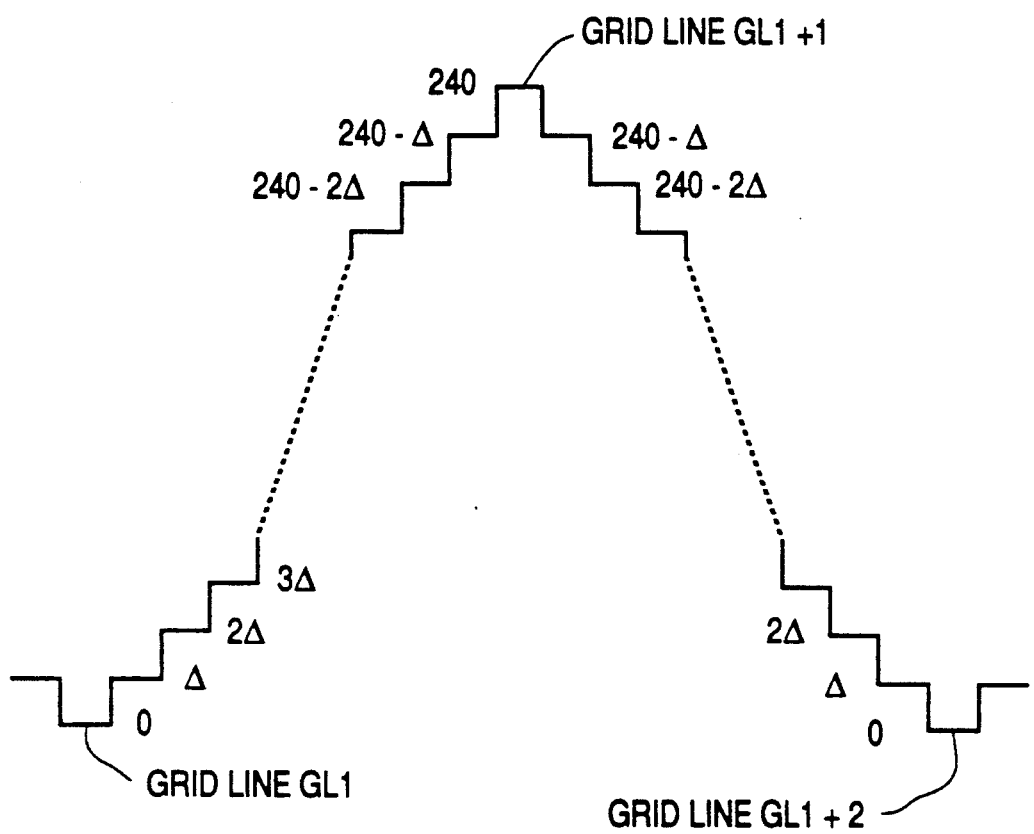

FIG. 12(b) is a clock counting diagram for the circuit shown in FIG. 10(a).

Figure 1:
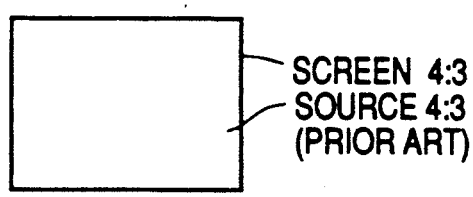
Figure 2A:
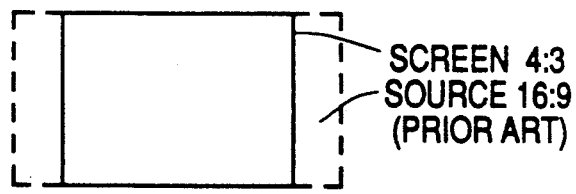
Figure 2B:
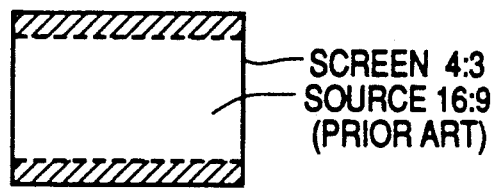
Figure 3:
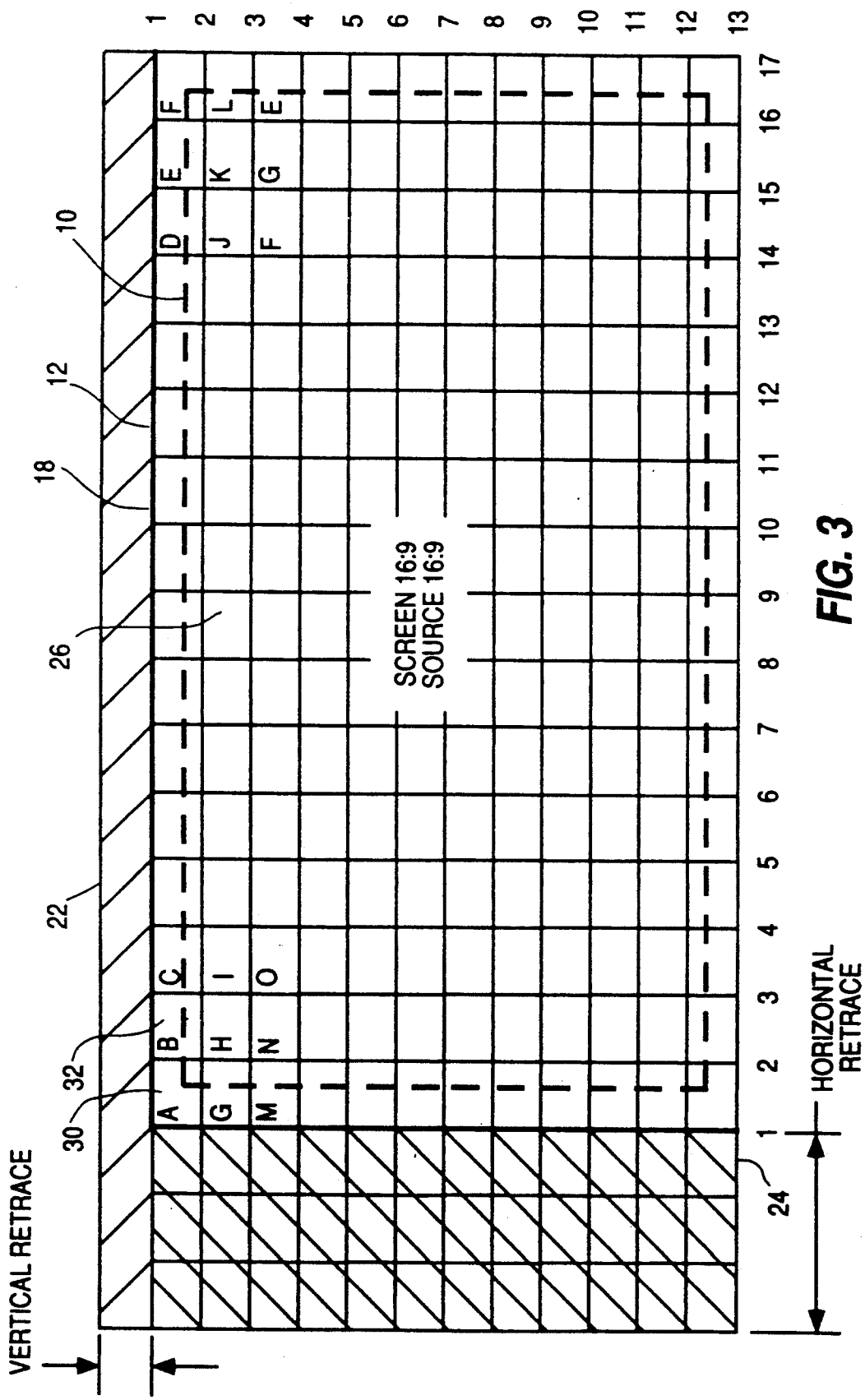
FIG. 3 illustrates a matrix defining a convergence correction grid for a 16:9 aspect ratio video source displayed on a 16:9 aspect ratio screen.

FIG. 13 is a portion of the matrix shown in FIG. 3, in enlarged scale.

FIGS. 14(a) through 14(f) illustrate timing signals for operation of the convergence control system shown in FIG. 8.

Figure 15:
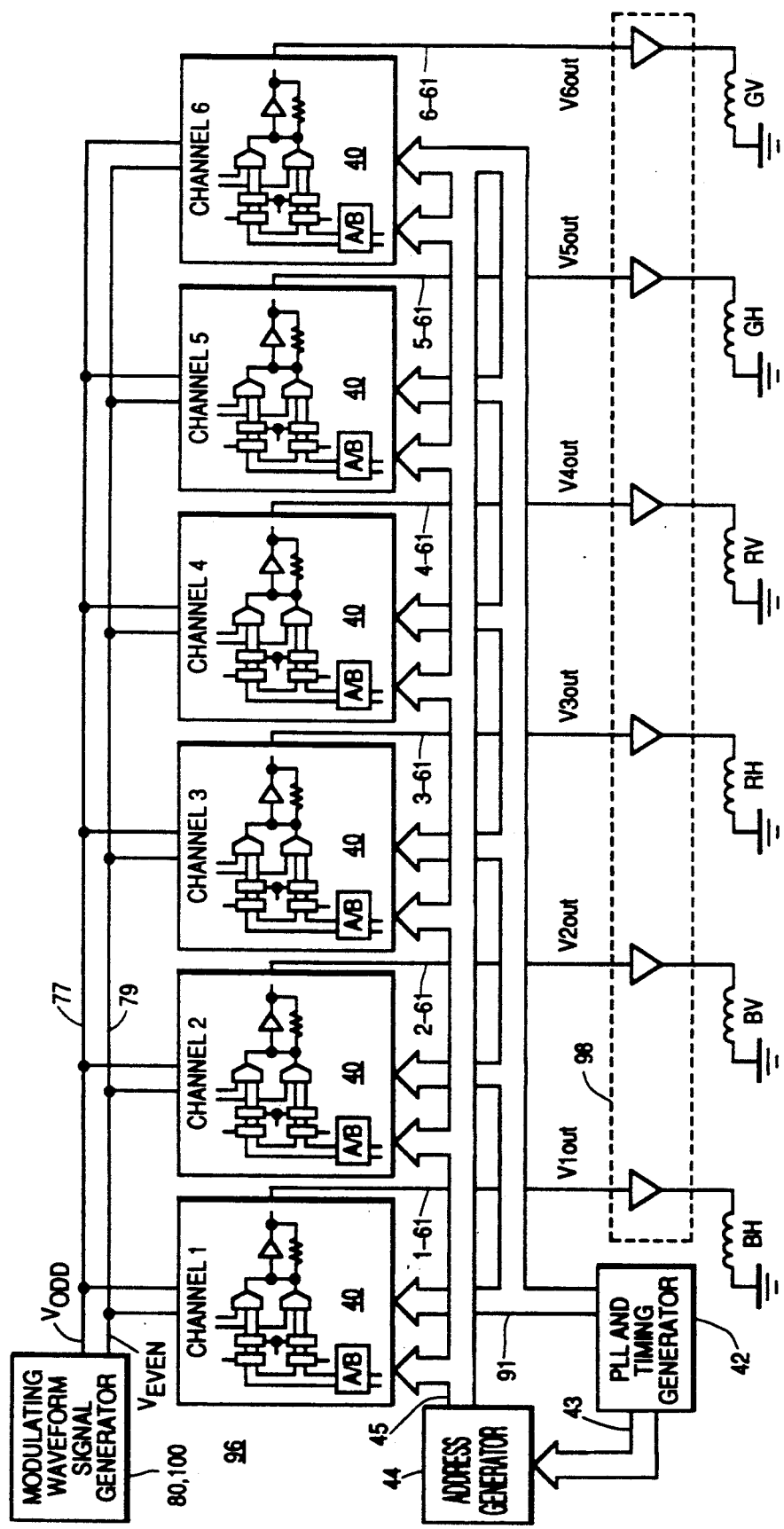

FIG. 15 is a block diagram of a convergence control system having a plurality of channels for generating a plurality convergence correction signals.

Figure 4:
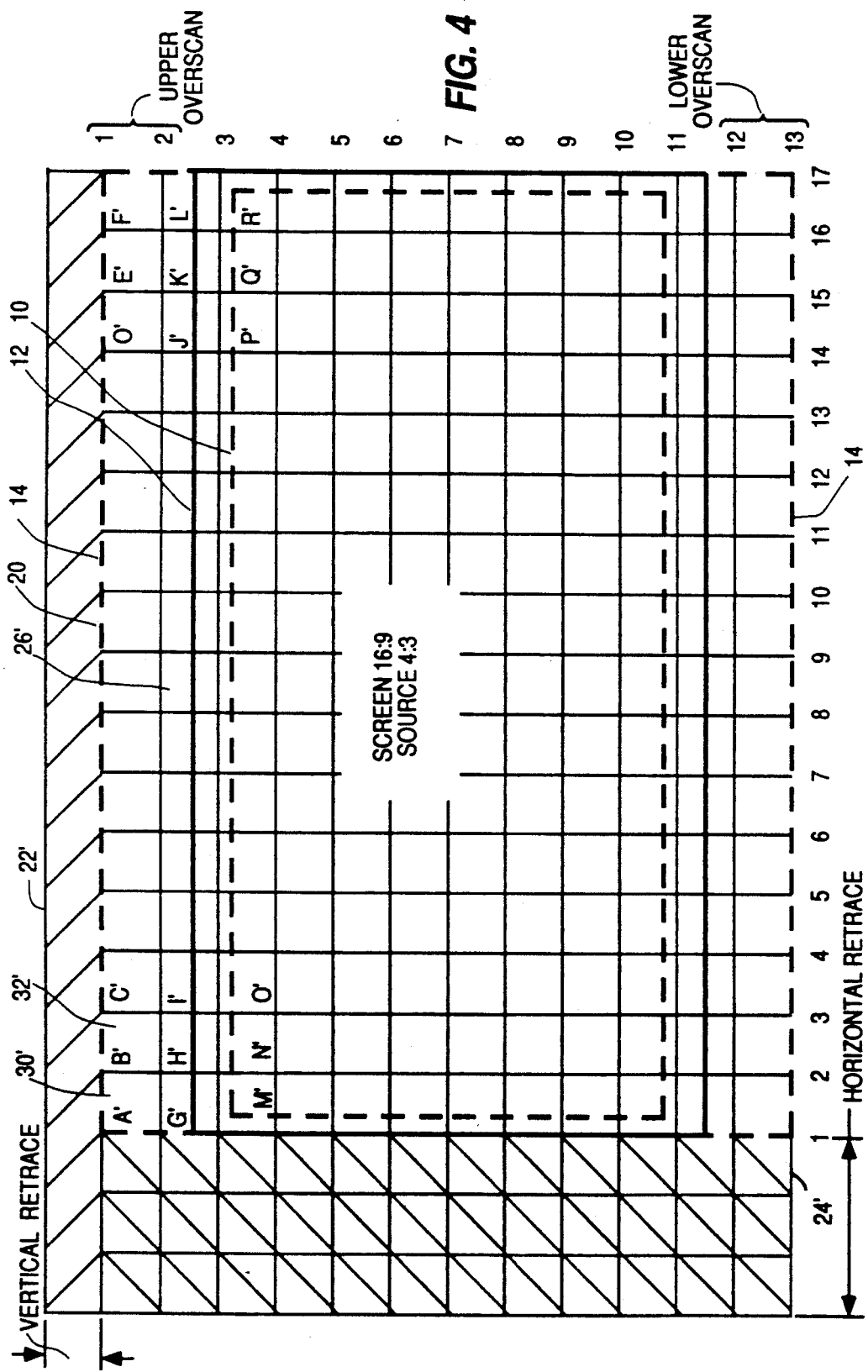
FIG. 4 illustrates a matrix defining a convergence correction grid for a 4:3 aspect ratio video source displayed on a 16:9 aspect ratio screen, by a vertically overscanned display mode.

The scan area of a raster 18 is shown in FIG. 3. The scan area is defined by a plurality of sections or blocks, for example 30, 32, etc., forming a matrix. The scan area of a raster 20 is shown in FIG. 4, and includes a matrix defined by blocks, for example 30', 32', etc. The uppermost row of each matrix, defining areas or portions 22, 22' represents the time necessary for a vertical retrace, approximately 825 microseconds for a 2H progressively scanned signal at 60 Hz. The three leftmost columns defining areas or portions 24, 24' represent the time needed for each horizontal retrace, which for the same 2H signal is approximately 10 microseconds. Areas or portions 22, 22' and 24, 24', representative of the vertical and horizontal retrace times respectively, are inactive scan areas. The remaining areas or portions 26, 26' are the active scan areas. The size of the active scan area 26 and the grid is somewhat larger than, for example, the boundary 10 of the projection screen of the projection television apparatus or the image display portion of the cathode ray tube in a direct view television. The active scan area 26' and the grid are considerably larger than the display area, defined by boundary 10. Top pincushion distortion may be so severe that, if uncorrected, the middle of even the first horizontal scan line may bow downwardly into the visible part of the display. Convergence correction must therefore be provided for all horizontal scan lines, even if not intended to be visible. Alternatively, the nonvisible horizontal scan lines may be blanked, if not corrected for convergence distortion.

Each of the active scan areas 26, 26' is defined by a matrix of 12 rows and 16 columns, which define convergence correction grids having 13 horizontal grid lines and 17 vertical grid lines, respectively so numbered. The horizontal scan time between each adjacent vertical grid line is approximately 1.68 microseconds. The number of horizontal scan lines required for traversing each row, that is, the distance between adjacent vertical grid points, depends on the scanning rate and the interlaced or noninterlaced nature of the frames. For the grids shown, and at 2H scanning rates, there are: 48 lines per row, for noninterlaced scanning at 50 Hz; 40 lines per row, for noninterlaced scanning at 60 Hz; 24 lines per row, for interlaced scanning at 100 Hz; and, 20 lines per row, for interlaced scanning at 120 Hz.

Figure 5:
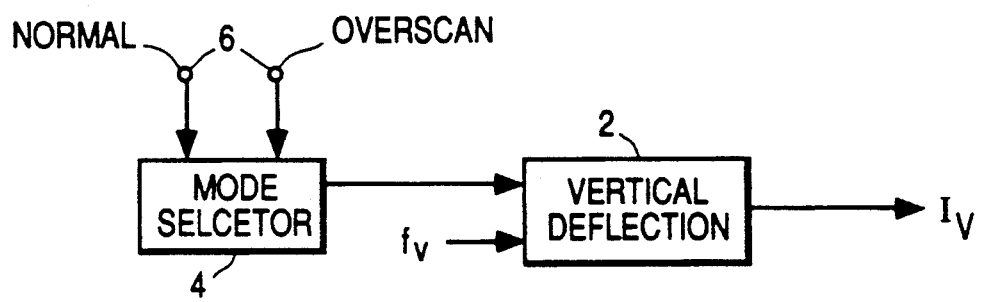
FIG. 5 is a block diagram of a circuit for generating rasters having different vertical heights.

The horizontal scan lines are spaced farther apart in an overscan mode because the same number of scan lines must traverse a larger vertical dimension. In FIG. 5, a vertical deflection circuit 2 generates a vertical deflection current Iv synchronized with a vertical rate frequency signal fv. Vertical deflection circuit 2 is responsive to a mode selector 4, which provides command information to the vertical deflection circuit identifying one of a plurality of vertical modes or formats, each of which may be characterized by a raster of a different vertical height. The mode selector 4 may be responsive to mode selection signals, which may be generated, for example, by buttons 6. As illustrated, the buttons 6 may be selectively depressed to initiate normal and overscan modes. Normal mode may be operable as a default mode of operation, in which case buttons 6 would be used to initiate other than normal modes.

The solid line signal in FIG. 6 represents a normal vertical deflection current Iv. The maximum and minimum values are shown by arbitrary units which equal $+1$ and $-1$ respectively. The period corresponds to the time duration of each vertical field, Tv. The normal current Iv would be used in the raster shown in FIG. 3. The overscan current shown by dotted line extension of the normal current would be used for the raster shown in FIG. 4. The raster in FIG. 4 is larger in vertical dimension than the raster in FIG. 3 by a factor of 4/3. Accordingly, the maximum and minimum values are approximately $+1.33$ and $-1.33$ respectively. The period Tv is the same for both signals, as the vertical period is a function of the video source.

Reference numerals 30 and 32 identify two blocks or sections in FIG. 3. Block or section 30 is bounded by grid intersection points A, B, G and H. Block or section 32 is bounded by grid intersection points B, C, H and I. In FIG. 4, block or section 30' is bounded by grid intersection points A', B', G' and H'. Block or section 32' is bounded by grid intersection points B', C', H' and I'. Blocks or sections 30 and 32 are shown in enlarged scale in FIG. 13.

In terms of the standard notation of an (X, Y) coordinate system, grid point A lies on coordinates (1, 1). Grid point B lies on coordinates (1, 2). Grid point C lies on coordinates (1, 3). Grid point G lies on coordinates (2, 1). Grid point H lies on coordinates (2, 2). Grid point I lies on coordinates (2, 3). The same is true for grid points A', B', G' and H' although respective correction values may be different because the grid points will not coincide.

The exact value of the correction signal at every grid point is determined by superimposing the red, green and blue rasters at that point. These exact values are stored in non-volatile memory for each channel and represent the alignment information for that particular television apparatus or instrument. If the digital storage is thought of, for purposes of illustration, as a corresponding matrix, the grid correction value will be a function of the coordinates of the particular grid point. In other words, the convergence correction value for grid point A in one of the channels will be a function of the coordinates (1, 1), that is, the correction value $V_A = f(1, 1)$. Similarly, the correction value $V_B = f(2, 1)$, the correction value $V_G = f(2, 1)$ and correction value $V_H = f(2, 2)$.

In order to provide a smooth transition of the correction signals between adjacent grid points, the interpolation must be performed in both the vertical and horizontal directions. The values at the grid points, represented by $V_A$ and $V_B$ and $V_G$ and $V_H$ are the exact desired values determined during alignment. A two-dimensional interpolation must be performed from these known values to obtain the correction signal at all of the points within that block or section. The unknown values $V_S$ and $V_T$ and $V_U$ are part of a horizontal scan line X that does not fall exactly on a grid line.

The interpolation in the horizontal direction may be performed by low pass filtering the correction values, because the known convergence values occur sequentially as each horizontal scan line proceeds. In order to smoothly go from grid value $V_A$ to grid value $V_B$ it is necessary only to sequentially output value $V_A$ during a time period equal to a grid spacing, for example approximately 1.68 microseconds, and then value $V_B$ for the same time period. If the filter response time is equal to the grid spacing, the correction signal will make a smooth transition from value $V_A$ to value $V_B$. The response time will depend upon the filter at the output of the digital to analog converter and the response of the convergence power amplifier.

Interpolation in the vertical direction requires more processing because vertically adjacent grid coordinate values do not occur sequentially during the same horizontal scan line. Instead, for example, the unknown values $V_S$ and $V_U$ on scan line X must be determined from the known values, for example $V_A$ and $V_B$ and $V_G$ and $V_H$. If values $V_S$ and $V_U$ can first be determined, these values can then be subjected to the low pass filtering for horizontal interpolation. This horizontal interpolation will develop correction value $V_T$ as well as all other intermediate values on the line segment SU.

Consider the interpolation necessary for blocks or sections 30 and 32, with particular reference to FIG. 13. In order to scan along the first horizontal grid line, without regard for other lines or interpolation, the low pass filter must be fed with the values for grid points A, B and C sequentially at intervals of approximately 1.68 microseconds. However, intermediate lines impose a need for an interpolation scheme which treats rows of blocks at a time, as each row of blocks represents a set of horizontal scan lines. An interpolation scheme illustrated in FIG. 13 is based upon the fact that a number n of horizontal scan lines are required to traverse the screen or other display from the first horizontal grid line to the end of the row just above the second horizontal grid line, as is the case for all adjacent horizontal grid lines. Intermediate scanning line X, further identified as 6', is the sixth intermediate scanning line of the first row, or set of horizontal scanning lines. Intermediate scan line 6' includes line segment SU, as shown. In an effort to smooth the transition between vertically adjacent grid points, a higher weighting factor is applied to the intermediate values closest a particular known grid value. For example, point S is Z arbitrary units below point A and (n−Z) arbitrary units above point G. The arbitrary units correspond to the vertical separation between horizontal scan lines, which will change for different vertical formats and different video transmission systems. Accordingly, the value $V_F = (n-Z)/n * V_A + Z/n * V_C$. If $V_A=2$, $V_G=1$, $n=24$ and $Z=6$, then $V_S=1.667$, rounded off. The value is between $V_A$ and $V_G$ and is proportional to the relative distances between point A and point S, and between point S and point G.

Vertical interpolation for a given vertical mode or format can be seen as sequentially generating and processing intermediate convergence correction values for the intersection of each intermediate horizontal scanning line and a vertical grid line. If these corrections values can be presented in proper sequence to the horizontal low pass filtering circuit, with proper timing, a precise convergence correction signal can be generated in real time.

A convergence correction system in accordance with an aspect of this invention is shown in block diagram form in FIG. 7. A phase locked loop (PLL) and timing generator 42 receives clock pulses, vertical synchronizing pulses and horizontal synchronizing pulses as inputs. An address generator 44 receives control signals from the PLL and timing generator to generate sequential addresses as output to a data store 46. Data store 46 has the known convergence correction values stored therein in digital form. The known values correspond to the grid points, that is, the correction values at the intersections of the horizontal and vertical grid lines. Data store 46 contains two sets 46A and 46B of convergence correction values, each of which is appropriate for a different vertical mode, that is, having a raster with a particular vertical height. Data store 46 may be embodied as a single storage medium in which the sets are differentiated from one another by a most significant address bit. Alternatively, data stores 46A and 46B may be embodied as separate storage media, selectable by a mode selection command signal. In any event, a data store will be provided for each vertical mode which can be implemented by the vertical deflection circuit 2. A correction value interpolator and signal generator circuit 40 produces the convergence correction signals, for m number of channels as are needed, as Vout1, Vout2, . . . Voutm.

A more detailed block diagram of the circuit shown in FIG. 7 for sequentially supplying the proper known correction values and subsequently interpolating those values is shown in in FIG. 8. The portion designated by reference numeral 40 corresponds to a single channel in a multichannel system. The part of the overall circuit common to all channels comprises the PLL and timing generator 42 and the address generator 44. The correction value interpolator and signal generator 40 comprises the digital convergence correction value storage means 46, four 8-bit latches identified as L1, L2, L3 and L4, and a pair of multiplying digital to analog converters 56 and 58, the outputs of which are summed by operational amplifier 60. Storage means 46 comprises at least two data stores 46A and 46B. Modulating waveforms shown in FIGS. 9(a) and 9(b) are identified as Veven and Vodd. The waveforms are generated by the circuit shown in block diagram form in FIG. 10, and supplied respectively to multiplying digital to analog converters 56 and 58. The circuit can also be constructed with only three latches, provided that the timing sequence is suitably revised.

With reference to FIG. 8, the phase locked loop and timing generator 42 receives horizontal and vertical synchronizing pulses, or timing pulses related thereto, from the deflection circuit of the television apparatus. The phase locked loop and timing generator produces a phase or line locked clock running at 76 times the horizontal frequency, which for a 2H progressively scanned NTSC standard is approximately 2.4 MHz. The vertical and horizontal timing signals and the clock signal are all of the timing signals necessary for operating the address generator and the latches for the multiplying digital to analog converters. The line locked clock may also be used to produce an alignment test pattern.

The address generator 44 receives appropriate timing pulses from the phase locked loop and timing generator 42, and generates the necessary address to select the next word to be loaded into the multiplying digital to analog converters. Each such word corresponds to the convergence correction value for a particular grid point, expressed and stored in digital form.

The words, or correction values, for each channel are stored in a digital value storage means 46. Storage means 46 may be non-volatile. Alternatively, storage means 46 may be volatile memory, which is loaded from non-volatile storage means at another location in the apparatus, during the power-up operation.

The output of storage means 46 is available as an input to both latches L1 and L2. The output of latch L1 is an input to latch L3, and the output of latch L3 is an input to the converting input of multiplying digital to analog converter 56. The output of latch L2 is an input to latch L4, and the output of latch L4 is an input to the converting input of multiplying digital to analog converter 58. The latches are used to store the present and next values for each multiplying digital to analog converter. Latches L1 and L2 are sequentially loaded with the next two values, and latches L3 and L4 are simultaneously loaded when it is time to update the multiplying digital to analog converter outputs.

The timing diagram shown in FIGS. 14(a)–14(f) corresponds in time scale to the horizontal separation of the vertical grid lines shown in FIG. 6. The sequence of values supplied to the latches from the storage means, responsive to the address generator, is A G B H C I. At the initiation of clock pulse 1 in FIG. 14(a), latch L1 contains the correction value for point A, latch L2 contains the correction value for point G, latch L3 contains the correction value for point A, and latch L4 contains the correction value for point G. Accordingly, multiplying digital to analog converter 56 converts the digital value for point A to analog form, multiplying that analog value by the amplitude of the Veven modulating waveform on line 79. For the row of blocks shown in FIG. 13, this amplitude will be one. Similarly, the correction value for point G is converted to analog form by multiplying digital to analog converter 58, and subsequently multiplied by the value of the Vodd modulating waveform on line 77. For the row shown in FIG. 13, this value is zero.

A latch L1 enable pulse L1 EN shown in FIG. 14(b) occurs at the end of clock pulse and loads the correction value for point B into latch L1. A latch L2 enable pulse L2 EN shown in FIG. 14(c) occurs at the end of clock pulse 3 and loads the correction value for point H into latch L2. A latch L3, L4 enable pulse L3, L4 EN shown in FIG. 14(d) occurring at the end of clock pulse 4 loads the correction value for point B into latch L3 and the correction value for point H into latch L4. A similar process takes place during clock pulses 5 through 8, whereby at the end of clock pulse 8, the correction value for point C is stored in latch L3 and the correction value for point I is stored in latch L4. It can be appreciated that the correction values for points A and G remain in latches L3 and L4 respectively for four clock periods, which is equivalent to the approximately 1.68 microsecond interval between the first and second vertical grid lines. In other words, as the horizontal scan line proceeds from left to right along the first horizontal grid line, the correction values for points A and G are being processed by the multiplying digital to analog converters while the scan line is between the first and second vertical grid lines. The correction values for points B and H are processed by the multiplying digital to analog converters while the horizontal scan proceeds from the second vertical grid line to the third vertical grid line. The correction values for points C and I are processed by the multiplying digital to analog converters while the horizontal scan proceeds from the third vertical grid line to the fourth vertical grid line. FIG. 14(f) illustrates the yoke current and output voltage for the sixth (6') intermediate scan line X. The current and voltage waveforms are illustrative of all of the horizontal scan lines. The output voltage changes in steps. The yoke current proceeds smoothly from known value to known value as a result of the low pass filtering.

Alternatively, either of latches L2 and L4 may be omitted. If latch L2 is omitted, then L3, L4 EN can occur after clock pulse 3, moving $V_B$ from latch L1 to latch L3 and moving $V_H$ into latch L4. The L2 EN signal is unnecessary. The fourth latch shown in FIG. 3 is included to facilitate the explanation.

The modulating waveforms shown in FIGS. 9(a) and 9(b) provide a measure of the location of any present horizontal scan line with respect to the horizontal grid lines above and below the present scan line. The modulating waveforms are complementary, that is out of phase with one another, in that the peaks of one correspond in time to the zeros of the other, and vice versa. The sum of the modulating waveforms is always constant. Moreover, the respective zeros and peaks of the two modulating waveforms always coincide with those horizontal scan lines which fall on horizontal grid lines. It is this relative timing, for example, which assures that for the horizontal scan line coinciding with the second horizontal grid line, the weighting factor for $V_G$ is one and the weighting factor for $V_M$ on the third horizontal grid line, is zero. Although the modulating waveforms are shown as triangular in overall form, the modulating waveforms are in fact stairstep in nature, as apparent when seen in enlarged scale. This ensures that the relative weighting factors applied to horizontally adjacent grid points will remain the same for each horizontal scan line in each row of blocks. Alternatively, the modulating waveforms may have an overall sawtooth form, with the trailing edge of each sawtooth pulse falling or rising sharply, as appropriate, during each horizontal retrace. Such modulating waveforms present more complex address control and timing problems. Advantageously, as a triangular waveform, waveform Vodd will have a peak amplitude for each scan line coinciding with an odd numbered horizontal grid line. Conversely, waveform Veven as a triangular waveform will have a peak amplitude for each scan line coinciding with an even numbered horizontal grid line. Similarly, waveforms Vodd and Veven will have zero amplitudes for scan lines coinciding with even and odd numbered horizontal grid lines, respectively. Accordingly, values on even numbered horizontal grid lines are always presented to the multiplying digital-to-analog converter 56, modulated by waveform Veven. Values on odd numbered horizontal grid lines are always presented to multiplying digital-to-analog converter 58, modulated by Vodd.

In accordance with an aspect of this invention, each modulating waveform has a period which is related to the number of horizontal scan lines between horizontal grid lines. The period is equal to 2n, where n is the number of scan lines in each row. Moreover, each correction value is supplied to only one of the multiplying digital to analog converters. Use of modulating waveforms having a period of 2n scan lines assures that the values on respective horizontal grid lines are sequentially processed as upper and lower boundaries of successive rows. The generation and timing problems of the digital addressing can be substantially reduced, provided that the upper and lower known values for each row of scan lines are applied to the same multiplying digital to analog converters as each subsequent row of scan lines is scanned.

A circuit 70 for generating the modulating waveforms shown in FIGS. 9(a) and 9(b), with fixed periods, is shown in FIG. 10(a). An up/down counter 72 receives horizontal and vertical synchronizing pulses, or related timing pulses. The counter 72 continuously counts from 0 to 20 (20 scan lines per row for 2H interlaced scan at 120 Hz, for example), and back from 20 to 0 using the horizontal line retrace pulse as its clock. A counting diagram for this circuit is shown in FIG. 10(b). Count 0 corresponds to a horizontal grid line, denoted GL1. Count 19 is just before the next grid line. Count 20 corresponds to the next horizontal grid line, GL1+1. The next count 0 corresponds to the next horizontal grid line GL1+2. The counts for successive rows of scan lines run from 0 to 19, 20 to 1, 0 to 19, 20 to 1, etc. A vertical retrace pulse resets the counter to lock the generated waveforms to the vertical deflection circuit. The digital number is converted to analog form by digital to analog converter 74. Amplifier 76 provides waveform Vodd as an output at terminal 77. Difference amplifier 78 produces the complementary waveform Veven at terminal 79 by subtracting the output of the digital to analog converter from a fixed reference. The fixed reference should be set to the maximum output of the digital to analog converter.

Modulating waveforms with selectable periods are provided for generating convergence correction waveforms appropriate for different vertical formats in accordance with an aspect of the invention. In implementing circuits to generate such waveforms, it is important that the maximum value of the waveforms be constant, and that this constant value occur at a fixed location on the screen or display area. Circuits for achieving this result are shown in FIGS. 11 and 12(a).

A circuit 80 for generating the modulating waveforms with selectable periods, corresponding to selected vertical formats, is shown in FIG. 11. A 6 bit up/down counter 84 receives horizontal and vertical synchronizing pulses, or related timing signals. The counter 84 is incremented and decremented by horizontal timing signals, for example, horizontal synchronizing pulses. Vertical timing signals, for example vertical synchronizing pulses or retrace pulses, reset the counter to lock the generated waveforms to the vertical deflection circuit. The counter 84 continuously counts from 0 to one of a plurality of selectable numbers, depending upon the selected vertical format, and then back to 0. For the circuit illustrated, the maximum counts are: 20 for 120 Hz (20 lines per row); 24 for 100 Hz (24 lines per row); 40 for 60 Hz (40 lines per row); and, 48 for 50 Hz (48 lines per row). The selectable number is supplied by maximum count circuit 86. The clock counting diagram is the same as in FIG. 10(b) for a maximum count of 20. The number of stairsteps will increase accordingly for higher maximum counts.

The output of the counter 84 is converted from digital to analog form by a 6 bit digital to analog converter 82. The reference value Iref for the digital to analog converter is also one of a plurality of selectable values, corresponding to the selected vertical format. The reference value is supplied by current source circuit 88. The current source circuit 88 and the maximum count circuit 86 are responsive to a vertical deflection rate mode selector 90. Operational amplifiers 76 and 78 are coupled to the output of the digital to analog converter 102, to generate complementary waveforms described above.

The maximum count circuit 86 determines the number of steps in the waveforms, one step being provided for each horizontal scan line. The current source circuit 88 determines the height of the steps. The currents are measured with respect to an arbitrary constant k, which provides for matching the current levels to the capacity of the integrated circuits used in the system. For the circuit illustrated, the current values are: $k\mu A$ for 120 Hz; $20k/24\ \mu A$ for 100 Hz; $20k/40\ \mu A$ for 60 Hz; and, $20k/48\ \mu A$ for 50 Hz.

Another circuit 100 for generating the modulating waveforms with selectable periods, corresponding to selected vertical formats, is shown in FIG. 12(a). An 8 bit variable step up/down counter 104 receives the same horizontal and vertical synchronizing pulses, or related timing signals. The counter 104 is incremented and decremented by horizontal timing signals and is locked to the vertical deflection circuit by vertical timing signals. The counter 104 counts continuously from 0 to 239 (240 counts) and back to 0. The maximum count is determined by maximum count circuit 110. The count is chosen as a common multiple of the variable steps required for the available selectable vertical modes. As illustrated, the step selector circuit 106 provides selectable steps of: 5 counts (48 lines per row), 6 counts (40 lines per row); 10 counts (24 lines per row); and, 12 counts (20 lines per row). A counting diagram for this circuit is shown in FIG. 12(b) wherein Δ corresponds to the magnitude of the selectable step. The counter counts from 0 to 239, 240 to 1, 0 to 239, 240 to 1, etc., for successive rows of scan lines. The step selector circuit 106 is responsive to a vertical deflection rate mode selector circuit 108. The output of the counter 104 is converted to analog form by an 8 bit digital to analog converter 102. In this case, digital to analog converter receives a fixed reference value. In this regard, the circuit of FIG. 12(a) may be easier to implement. The output of digital to analog converter 102 is processed by operational amplifiers 76 and 78 to provide complementary waveforms as described above.

A convergence control system for a projection television apparatus in accordance with an aspect of the invention is shown in block diagram form in FIG. 15, and generally designated by reference numeral 96. Six convergence correction signals are required, requiring six processing channels. Convergence correction signals must be generated for blue horizontal BH, blue vertical BV, red horizontal RH, red vertical RV, green horizontal GH and green vertical GV. A correction signal/interpolator circuit 40 must be provided for each of the six channels. Each channel contains its own correction value storage means 46. Each storage means comprises data stores 46A and 46B, for at least two vertical formats. Additional data stores would be provided for additional vertical formats. Each data store has a set of convergence correction values which is uniquely programmed for each channel and each vertical format. Multiple scanning rates are possible for each available vertical format, as described above. Each of the channel processors works in parallel, generating a convergence correction waveform in real time, for each horizontal scan line.

All of the six processing channels operate responsive to a single modulating waveform signal generator 80 or 100, a single phase lock loop and timing generator 42 and a single address generator 44. The output signals of each channel, on lines 1-61 through 6-61 respectively, are inputs to a convergence output amplifier circuit 98. The amplifiers in circuit 98 drive respective convergence coils, for blue horizontal BH, blue vertical BV, red horizontal RH, red vertical RV, green horizontal GH and green vertical GV. It can be appreciated from FIG. 15 that a convergence control system in accordance with this aspect of the invention may be implemented with a minimum of additional hardware, with respect to a system appropriate for only one vertical format.

What is claimed is:

1. A convergence control system for multiple vertical formats, comprising:
   means for selecting one of a number of vertical formats for displaying a video signal, different vertical formats having different vertical heights;
   a data store for different sets of convergence correction values, for generating selectable sets of convergence correction signals, said sets of convergence correction values defining different sets of grid lines substantially parallel with horizontal scan lines, adjacent ones of said grid lines being spaced from one another at different intervals for said different vertical formats; and,
   means for generating said convergence correction signals for said video signal from each of said sets of convergence correction values, said generating means being responsive to said selecting means for producing convergence correction signals uniquely appropriate for said selected vertical format.

2. The system of claim 1, wherein said correction signals are generated in accordance with said convergence correction values and in accordance with interpolation of said convergence correction values.

3. The system of claim 1, wherein said intervals between said grid lines are greater for vertical formats having relatively greater vertical heights.

4. A television apparatus, comprising:
   a display means;
   a vertical deflection circuit; and,
   a convergence control system for multiple vertical formats, comprising:
      means for selecting one of a number of vertical formats for displaying a video signal, different vertical formats having different vertical heights;
      a data store for different sets of convergence correction values, for generating selectable sets of convergence correction signals, said sets of convergence correction values defining different sets of grid lines substantially parallel with horizontal scan lines, adjacent ones of said grid lines being spaced from one another at different intervals for said different vertical formats; and,
      means for generating said convergence correction signals for said video signal from each of said sets of convergence correction values, said generating means being responsive to said selecting means for producing convergence correction signals uniquely appropriate for said selected vertical format.

5. The apparatus of claim 4, wherein each of said vertical formats is characterized by a different ratio of vertical raster height to vertical height of said display means.

6. The apparatus of claim 4, wherein said display means has an aspect ratio of approximately 16:9.

7. The apparatus of claim 6, wherein one of said vertical formats has an aspect ratio of approximately 4:3.

8. The apparatus of claim 4, wherein one of said vertical formats has an aspect ratio of approximately 16:9.

9. The apparatus of claim 4, wherein one of said vertical formats has an aspect ratio of approximately 4:3.

10. A convergence control system for multiple vertical formats, comprising:
    means for selecting one of a number of vertical formats for displaying a video signal, said vertical formats differing by respective vertical scanning rates;
    means for storing a selectable set of convergence correction values for positions on a selectable raster defined by horizontal and vertical grid lines, said horizontal grid lines being spaced differently from one another during operation at different vertical scanning heights;
    means for storing an interpolation control value for each of said vertical formats; and,
    interpolating means responsive to said control values for generating a different set of intermediate convergence correction values for each of said vertical formats from said set of stored convergence correction values.

11. The system of claim 10, wherein said interpolating means generates intermediate convergence correction values between vertically spaced raster locations from said selectable set of stored convergence correction values.

12. A convergence control system for multiple vertical formats, comprising:
    means for selecting one of a number of vertical formats for displaying a video signal, said vertical formats differing by respective vertical scanning heights;
    means for storing a set of convergence correction values for each of said vertical scanning heights, said correction values corresponding to a plurality of raster locations defined by horizontal and vertical grid lines, said horizontal grid lines being spaced differently from one another for each of said vertical scanning heights;
    interpolating means for generating intermediate convergence correction values between vertically spaced ones of said raster locations for each of said sets of convergence correction values.

13. The system of claim 12, wherein said interpolating means is responsive to different control values for generating a different set of intermediate convergence correction values from each of said sets of stored convergence correction values.

14. A convergence control system for multiple vertical formats, comprising:
    means for selecting one of a number of vertical formats for displaying a video signal, said vertical formats differing by at least one of respective vertical scanning rates and respective vertical scanning heights;
    means for storing a set of convergence correction values for each of said vertical scanning heights, said convergence correction values corresponding to a plurality of raster locations defined by horizontal and vertical grid lines, said horizontal grid lines being spaced differently from one another for each of said vertical scanning heights;
    means for storing an interpolation control value for each of said vertical scanning frequencies; and,
    interpolating means responsive to said control values for generating a different set of intermediate convergence correction values for each of said vertical scanning frequencies, from each of said sets of stored convergence correction values.

15. The system of claim 14, wherein said interpolating means generates said intermediate convergence correction values nonlinearly between said horizontal grid lines.

16. A convergence control system for multiple vertical formats, comprising:
- means for selecting one of a number of vertical formats for displaying a video signal, said vertical formats differing by respective vertical scanning rates;
- means for storing a set of convergence correction values;
- means for storing an interpolation control value for each of said vertical formats; and,
- interpolating means responsive to said control values for generating a different set of nonlinearly-weighted intermediate convergence correction values for each of said vertical formats from said set of stored convergence correction values.

17. The system of claim 16, wherein said interpolating means generates intermediate convergence correction values between vertically spaced raster locations from said set of stored convergence correction values.

18. A convergence control system for multiple vertical formats, comprising:
- means for selecting one of a number of vertical formats for displaying a video signal, said vertical formats differing by respective vertical scanning heights;
- means for storing a set of convergence correction values corresponding to a plurality of raster locations for each of said vertical formats; and,
- interpolating means for generating nonlinearly-weighted intermediate convergence correction values between vertically spaced ones of said raster locations for each of said sets of convergence correction values.

19. The system of claim 18, wherein said interpolating means is responsive to different control values for generating a different set of intermediate convergence correction values from each of said sets of stored convergence correction values.

20. A convergence control system for multiple vertical formats, comprising:
- means for selecting one of a number of vertical formats for displaying a video signal, said vertical formats differing by at least one of respective vertical scanning rates and respective vertical scanning heights;
- means for storing a set of convergence correction values corresponding to a plurality of raster locations for each of said vertical scanning heights;
- means for storing an interpolation control value for each of said vertical scanning frequencies; and,
- interpolating means responsive to said control values for generating a different set of nonlinearly-weighted intermediate convergence correction values for each of said vertical scanning frequencies, from each of said sets of stored convergence correction values.

21. The system of claim 20, wherein said interpolating means generates said intermediate convergence correction values between horizontally and vertically spaced ones of said raster locations.

* * * * *